United States Patent [19]

Potter et al.

[11] Patent Number: 4,507,427

[45] Date of Patent: Mar. 26, 1985

[54] PROCESS FOR THE PRODUCTION OF ORGANIC POLYISOCYANATES CONTAINING AT LEAST PARTLY BLOCKED ISOCYANATE GROUPS, THE COMPOUNDS OBTAINABLE BY THIS PROCESS AND THEIR USE IN THE PRODUCTION OF POLYURETHANES, STOVING LACQUERS OR AQUEOUS POLYISOCYANATE SOLUTIONS OR DISPERSIONS

[75] Inventors: Terry A. Potter, New Martinsville, W. Va.; Klaus Nachtkamp, Cologne; Franz Weider, Leverkusen, both of Fed. Rep. of Germany

[73] Assignee: Bayer Aktiengesellschaft, Leverkusen, Fed. Rep. of Germany

[21] Appl. No.: 628,372

[22] Filed: Jul. 5, 1984

[30] Foreign Application Priority Data

Jul. 20, 1983 [DE] Fed. Rep. of Germany ....... 3326188

[51] Int. Cl.$^3$ .............................................. C08G 18/80
[52] U.S. Cl. ..................................... 524/591; 528/45; 528/73; 549/265; 549/274
[58] Field of Search .................... 528/45, 73; 549/265, 549/274; 524/591

[56] References Cited

U.S. PATENT DOCUMENTS

| | | | |
|---|---|---|---|
| 4,073,932 | 2/1978 | Beriger | 424/279 |
| 4,098,933 | 7/1978 | Burkhardt et al. | 427/379 |
| 4,123,551 | 10/1978 | Beriger | 424/279 |
| 4,284,544 | 8/1981 | Wegner et al. | 260/29.2 |

OTHER PUBLICATIONS

Houben–Weyl, Methoden der Organischen Chemie, vol. XIV–2, pp. 61–70.
Z. Wicks, Jr. Prog. in Org. Coatings, 9, 3–28, (1981).
U. Herzog, H. Reinshagen, Eur. J. Med. Chem. 10, 323, (1975).

Primary Examiner—Maurice J. Welsh
Attorney, Agent, or Firm—Gene Harsh; Joseph C. Gil; Thomas W. Roy

[57] ABSTRACT

The present invention relates to a process for the production of organic polyisocyanates containing at least partly blocked isocyanate groups characterized in that specific cyclic dicarbonyl compounds are used as the blocking agent. The present invention also relates to the polyisocyanates containing at least partly blocked isocyanate groups obtainable by this process and to the use of the polyisocyanates containing at least partly blocked isocyanate groups obtainable by this process as reactants for isocyanate-reactive compounds for the production of isocyanate polyaddition products.

The present invention also relates to the use of polyisocyanates containing at least partly blocked isocyanate groups obtainable by the above process for the production of aqueous stoving lacquers and to the use of these polyisocyanates for the production of aqueous polyisocyanate solutions or dispersions. The aqueous stoving lacquers and aqueous polyisocyanate solutions or dispersions are mixed with water in the presence of a base used in a quantity which is sufficient to guarantee the solubility or dispersibility of the polyisocyanates.

15 Claims, No Drawings

PROCESS FOR THE PRODUCTION OF ORGANIC POLYISOCYANATES CONTAINING AT LEAST PARTLY BLOCKED ISOCYANATE GROUPS, THE COMPOUNDS OBTAINABLE BY THIS PROCESS AND THEIR USE IN THE PRODUCTION OF POLYURETHANES, STOVING LACQUERS OR AQUEOUS POLYISOCYANATE SOLUTIONS OR

BACKGROUND OF THE INVENTION

1. Field of the Invention

This invention relates to a new process for the production of organic polyisocyanates containing at least partly blocked isocyanate groups using cyclic dicarbonyl compounds as blocking agents for isocyanate groups, to the polyisocyanates containing at least partly blocked isocyanate groups obtainable by this process and to their use as reactants for organic polyhydroxyl compounds in the production of polyurethane plastics, aqueous stoving lacquers or aqueous polyisocyanate solutions or dispersions.

2. Description of the Prior Art

Blocked polyisocyanates which react at elevated temperature with compounds containing Zerewitinoff active hydrogen atoms are known and are described, for example in Houben-Weyl, "Methoden der Organischen Chemie", Vol. XIV/2, pages 61–70, or in Z. W. Wicks, Jr. Progress in Organic Coatings 9, 3–28 (1981). Suitable blocking agents for isocyanates are, for example, phenols, caprolactam, oximes and CH-acid compounds such as acetoacetic acid esters and malonic acid dialkyl esters.

Conventional blocked polyisocyanates may be used in combination with polyfunctional compounds containing Zerewitinoff-active hydrogen atoms for the production of heat-hardenable plastics, particularly stoving lacquers and coatings. In that case, they are used primarily in the form of solutions in organic solvents.

In the interests of pollution control and to save petroleum-based organic solvents, there is increasing interest in the possibility of using stoving resins of the type in question in the form of aqueous dispersions or solutions. Accordingly, there has been no shortage of attempts to produce water-soluble or water-dispersible blocked polyisocyanates. To this end, some of the isocyanate groups in the polyisocyanates are irreversibly reacted with compounds containing ionic, potentially ionic or non-ionic-hydrophilic groups. The remaining isocyanate groups are "masked" with one or more of the above-mentioned blocking agents which are readily split off again at elevated temperature. This procedure is described, for example, in DE-OS No. 2,456,469 and in EP OS No. 12,348. The hydrophilic or potentially hydrophilic synthesis components used therein include, for example, hydroxy carboxylic acids, tertiary amines containing hydroxyl groups, hydroxy polyethylene oxides, hydroxy sulfonic acids and polyaminosulfonates.

This procedure is attended by the disadvantage that a considerable proportion of the NCO-groups in the polyisocyanates used is always consumed for the reaction with the hydrophilic synthesis components mentioned. In the blocked polyisocyanates, this proportion of the functionality is then no longer available for a thermal crosslinking reaction with reactants containing Zerewitinoff-active hydrogen atoms at the stoving temperatures normally applied. Accordingly, the hydrophilic, blocked polyisocyanates described have technical disadvantages by comparison with the corresponding blocked isocyanates which are applied from organic solution.

Now, the object of the present invention is to provide blocked polyisocyanates which may be applied not only from organic solution, but also from the aqueous phase, without any modifications which would lead to the technical disadvantages mentioned above being required for their production.

This object is achieved by the provisions of the process according to the invention which is described in more detail hereinafter and by the products obtained by that process which are also described in detail hereinafter.

The process according to the invention is based on the surprising observation that reaction products of certain, cyclic dicarbonyl compounds described in more detail in the following with organic polyisocyanates represents blocked polyisocyanates which react with compounds containing Zerewitinoff-active hydrogen atoms at relatively low stoving temperatures and, in addition, are soluble or dispersible in water in the presence of weak organic bases, such as for example tertiary amines. It was also surprising to find that the cyclic dicarbonyl compounds may be added not only onto aromatic isocyanates, but also onto aliphatic isocyanates. This is of particular technical importance to the use of the adducts in the field of lacquers and coatings on account of the fastness of light of aliphatic isocyanates.

Hitherto, only adducts of cyclic dicarbonyl compounds of the type essential to the invention with aromatic monoisocyanates have been known from the literature (U. Herzog, H. Reinshagen, Eur. J. Med. Chem. 10, 323 (1975)). According to these authors, it was not possible to produce corresponding adducts with aliphatic isocyanates. The object of the cited works was the production of pharmaceuticals and insecticides (see also U.S. Pat. Nos. 4,073,932 and 4,123,551). Adducts of polyfunctional isocyanates and the cyclic dicarbonyl compounds mentioned have never been described before. Likewise, nothing is known of the reactivity of adducts such as these to compounds containing Zerewitinoff-active hydrogen atoms or of attempts to use such adducts for applications in the plastics field.

SUMMARY OF THE INVENTION

The present invention relates to a process for the production of organic polyisocyanates containing at least partly blocked isocyanate groups by at least partly blocking the isocyanate groups of organic polyisocyanates with blocking agents for isocyanate groups, characterized in that the blocking agents used are (a) cyclic dicarbonyl compounds containing the following characteristic structural unit

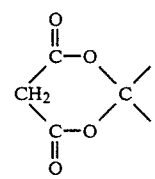

and, optionally, (b) additional blocking agents known from polyurethane chemistry, blocking agent (a) being used in quantities corresponding to a molar ratio of blocking agent (a) to isocyanate groups in the starting polyisocyanate of at least about 0.1:1 and the additional blocking agents (b) used, if any, being reacted with the starting polyisocyanate before, during or after the reaction of the starting polyisocyanate with the blocking agent (a).

The present invention also relates to the polyisocyanates containing at least partly blocked isocyanate groups obtainable by this process and to the use of the polyisocyanates containing at least partly blocked isocyanate groups obtainable by this process as reactants for isocyanate-reactive compounds, preferably organic polyhydroxyl compounds, in the production of isocyanate polyaddition products, particularly polyurethane-based lacquers, coating compositions or sealing compounds.

The present invention also relates to the use of the polyisocyanates containing at least partly blocked isocyanate groups obtainable by the process according to the invention for the production of aqueous stoving lacquers, characterized in that the polyisocyanates are mixed with aqueous solutions or dispersions of organic compounds containing at least two isocyanate-reactive groups in the presence of a base used in a quantity sufficient to guarantee the solubility or dispersibility of the polyisocyanates in water, the equivalent ratio of blocked isocyanate groups to isocyanate-reactive groups amounting to between about 0.1:1 and 1:1.2, and optionally in the presence of standard lacquer auxiliaries and additives.

Finally, the present invention also relates to the use of the polyisocyanates containing at least partly blocked isocyanate groups obtainable by the process according to the invention for the production of aqueous polyisocyanate solutions or dispersions, characterized in that the polyisocyanates are mixed with water in the presence of a base used in a quantity sufficient to guarantee the solubility or dispersibility of the polyisocyanates.

DETAILED DESCRIPTION OF THE INVENTION

Starting materials for the process according to the invention are any organic polyisocyanates and cyclic dicarbonyl compounds containing the structural units shown above.

In principle, any organic polyisocyanates or mixtures of organic polyisocyanates are suitable for the process according to the invention. Examples of suitable organic polyisocyanates are compounds corresponding to the following formula

in which

Q represents an aromatic hydrocarbon radical with a total of 6 to 15 carbon atoms optionally containing methyl substituents or methylene bridges; an aliphatic hydrocarbon radical containing from 4 to 18, preferably from 6 to 10 carbon atoms; a cycloaliphatic hydrocarbon radical containing from 6 to 15 carbon atoms or a xylylene radical.
and
n is an integer from 2 to 5.

Typical examples of polyisocyanates such as these suitable for use in accordance with the invention are tetramethylene diisocyanate, hexamethylene diisocyanate, 1,12-dodecane diisocyanate, cyclohexane-1,3- and 1,4-diisocyanate and mixtures of these isomers, 1-isocyanato-3,3,5-trimethyl-5-isocyanatomethyl cyclohexane (IPDI), perhydro-2,4'- and/or -4,4'-diphenylmethane diisocyanate, 1,3- and 1,4-phenylene diisocyanate, 2,4- and 2,6-tolylene diiosocyanate and mixtures of these isomers, diphenylmethane-2,4'- and/or -4,4'-diisocyanate, 3,2°- and/or 3,4'-diisocyanato-4-methyl diphenylmethane, naphthylene-1,5-diisocyanate, triphenyl methane-4,4',4''-triisocyanate, polyphenyl polymethylene polyisocyanates of the type obtained by phosgenating aniline-formaldehyde condensates and described for example, in British Pat. Nos. 874,430 and 848,671. In addition to these simple polyisocyanates, polyisocyanates containing heteroatoms in the radical attaching the isocyanate groups are also suitable. Examples of polyisocyanates such as these are polyisocyanates containing carbodiimide groups of the type described in German Pat. No. 1,092,007, polyisocyanates containing allophanate groups of the type described, for example, in British Pat. No. 994,890 and in Belgian Pat. No. 761,626, polyisocyanates containing isocyanurate groups of the type described, for example in U.S. Pat. No. 4,288,586, in German Pat. Nos. 1,022,789; 1,222,067 and 1,027,394, in German Offenlegungsschriften 1,929,034, 2,004,048 and 2,839,133 or in EP-PS No. 10,589, polyisocyanates containing urethane groups of the type described, for example in DE-PS No. 752,261 or in U.S. Pat. No. 3,394,164, polyisocyanates containing acylated urea groups according to German Pat. No. 1,230,778, polyisocyanates containing biuret groups of the type described, for example, in German Pat. No. 1,101,394, in British Pat. No. 889,050 and in French Pat. No. 7,017,514.

Polyisocyanates which are particularly suitable for the process according to the invention are the "lacquer polyisocyanates" known per se, i.e., biuret-isocyanurate- or urethane-group-containing modification products of the above-mentioned simple polyisocyanates, more particularly tris-(6-isocyanatohexyl)-biuret, optionally in admixture with its higher homologs, polyisocyanates containing isocyanurate groups obtainable by the trimerization of aliphatic and/or aromatic diisocyanates, such as, for example hexamethylene diisocyanate, isophorone diisocyanate, diisocyanato-toluene or mixtures of diisocyanatotoluene and hexamethylene diisocyanate, above all tri-(6-isocyanatohexyl)-isocyanurate optionally present in admixture with its higher homologs, or low molecular weight polyisocyanates containing urethane groups of the type obtainable for example, by reacting excess quantities of 2,4-diisocyanatotoluene with simple, polyhydric alcohols having a molecular weight in the range from about 62 to 300, particularly with trimethylol propane, followed by removal of the unreacted diisocyanate excess by distillation. Mixtures of the polyisocyanates mentioned by way of example may of course also be used for producing the products according to the invention.

Other polyisocyanates suitable for use in the process according to the invention are the known prepolymers containing terminal isocyanate groups of the type obtainable, in particular, by reacting the above-mentioned, simple polyisocyanates, above all diisocyanates, with substoichiometric quantities of organic compounds containing at least two isocyanate-reactive groups. Suitable organic compounds of this type are, in particular, compounds containing in all at least two amino groups, thiol groups, carboxyl groups and/or hydroxyl groups and having a molecular weight in the range from about 300 to 10,000 and preferably in the range from about 400 to 6000. The corresponding polyhydroxyl compounds are preferably used.

Preferred hydroxyl compounds are the hydroxy polyesters, hydroxy polyethers, hydroxy polythioethers, hydroxy polyacetals, hydroxy polycarbonates and/or hydroxy polyesters amides known per se in polyurethane chemistry.

Representatives of the above-mentioned polyisocyanate and hydroxyl compounds used in the production of the NCO-prepolymers suitable for use in accordance with the invention are described, for example, in High Polymers, Vol. XVI, "Polyurethanes, Chemistry and Technology", by Saunders-Frisch, Interscience Publishers, New York/London, Vol. I, 1962, pages 32 to 42 and pages 44 to 54, and Vol. II, 1964, pages 5–6 and 198–199, and in Kunststoff-Handbuch, Vol. VII, Vieweg-Hochtlen, Carl-Hanser-Verlag, Munich, 1966, for example on pages 45 to 71.

In the production of the NCO-prepolymers by methods known per se, the reactants are generally used in quantitative ratios which correspond to a ratio of isocyanate groups to NCO-reactive hydrogen atoms, preferably hydroxyl groups, of from about 1.05 to 10, preferably from about 1.1 to 3.

In addition, the type of and quantitative ratios between the starting materials used in the production of the NCO-prepolymers are preferably selected in such a way that the NCO-prepolymers have
(a) an average NCO-functionality of from 2 to 4 and preferably from 2 to 3, and
(b) an average molecular weight, which can be calculated from the stoichiometry of the starting materials, of from about 500 to 10,000, preferably from about 800 to 4000.

In the process according to the invention, reactants for the organic polyisocyanates mentioned by way of example are any organic compounds which contain a structural unit corresponding to the following formula

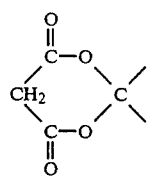

and which, apart from this group, are inert to isocyanate groups. Cyclic dicarbonyl compounds such as these are present very largely in the diketo form represented by the above formula and only to a minimal extent of the enol form.

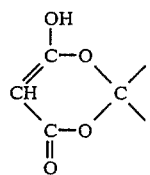

Accordingly, in the context of the present invention, the diketo form is representative of the mixture of the two tautomeric forms. All the quantities indicated relate to the mixture of both tautomers, even if the particular compounds occur partly in the enol form.

Eminently suitable cyclic dicarbonyl compounds of the type in question are those corresponding to the following formula

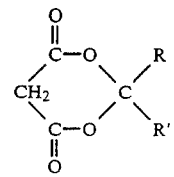

in which R and R' are the same or different and represent alkyl or aryl groups optionally containing inert substituents or, together with the carbon atom attached to the two oxygen atoms, form a cycloalkyl ring optionally containing inert substituents.

Particularly suitable compounds corresponding to the last of the above general formulae are those in which R and R' are the same or different and represent alkyl radicals containing from 1 to 4 carbon atoms, particularly methyl radicals, or those in which the radicals R and R', together with the carbon atom attached to the oxygen atoms, form a cycloaliphatic ring containing from 5 to 6, more particularly 6 carbon atoms.

It is particularly preferred to use the most well known representative of this class of compounds, namely isopropylidene malonate, also known as Meldrum's acid (R=R'=CH$_3$). This compound is obtainable by the condensation of malonic acid with acetone using acid catalysts (cf. A. N. Meldrum, J. Chem. Soc. 90, 598 (1908); D. Davidson et al, J. Amer. Chem. Soc. 70, 3429 (1948)). The other cyclic dicarbonyl compounds suitable for use in accordance with the invention may be correspondingly produced by the condensation of malonic acid and ketones corresponding to the following formula

in which R and R' have the meaning or preferred meaning defined above.

Thus, methyl ethyl ketone, methyl isobutyl ketone, cyclopentanone, cyclohexanone or acetophenone, for example, would be suitable reactants for malonic acid in the production of the cyclic dicarbonyl compounds suitable for use as blocking agents in accordance with the present invention.

Corresponding synthesis processes are described, for example, by B. Eistert et al. in Chem. Ber. 94, 929 (1961); by J. Swoboda et al. in Monatsh. 91, 188 (1960) or by A. Michael et al. in J. Amer. Chem. Soc. 58, 680 (1936).

To produce the blocked polyisocyanates according to the invention, the components described in detail in the foregoing, i.e. the organic polyisocyanates and the cyclic dicarbonyl compounds, are reacted with one another. The cyclic dicarbonyl compounds according to the invention are used in quantities which correspond to at least 10 equivalent percent, based on the NCO-groups of the polyisocyanates. This means that, in the application of the process accordding to the invention, the reactants are used in quantities corresponding to a molar ratio of cyclic dicarbonyl compounds to isocyanate groups of the starting polyisocyanate of at least about 0.1:1. The cyclic dicarbonyl compounds are preferably used in such quantities that from about 30 to 100% of the isocyanate groups react therewith, i.e. the starting materials are preferably used in quantities corresponding to a molar ratio of cyclic dicarbonyl compounds to isocyanate groups in the starting polyisocyanate of from about 0.3:1 to 1:1. However, it is also possible in principle to use excess quantities of cyclic dicarbonyl compound in order to accelerate and complete the reaction. In general, however, such an excess should not exceed from about 10 to 20 equivalent percent, based on the isocyanate groups in the starting polyisocyanate.

If the cyclic dicarbonyl compounds are used in a molar deficit in relation to the NCO-groups of the polyisocyanates, the excess isocyanate groups are preferably allowed to react off with other monofunctional blocking agents. Blocking agents suitable for this purpose are any isocyanate blocking agents of the type described, for example, by Z. W. Wicks, Jr. in Progress in Organic Coatings 9, 3–28 (1981). Examples of blocking agents such as these which may be additionally used are C—H-acid compounds such as malonic acid dialkyl esters and acetoacetic acid alkyl esters; oximes such as acetone oxime, methyl ethyl ketone oxime and acetaldoxime; lactams such as -caprolactam; and phenols such as phenol itself or alkyl derivatives thereof. In the process according to the invention, blocking agents such as these are used, if at all, in a maximum quantity corresponding to a molar ratio of blocking agents to isocyanate groups in the starting polyisocyanate up to about 0.9:1.

However, it is also readily possible to use the cyclic dicarbonyl compounds in a molar deficit in relation to the NCO-groups of the polyisocyanates and to leave the NCO-groups remaining after the reaction free so that they are available for further reactions, for example with chain-extending agents, water or polymers containing Zerewitinoff-active hydrogen atoms.

The reaction between the cyclic dicarbonyl compounds suitable for use in accordance with the invention and the polyisocyanates is generally carried out at temperatures in the range from about 0° C. to 80° C., preferably from about 20° C. to 60° C. If, as described, some of the isocyanate groups are to be reacted with other blocking agents, the reaction with those blocking agents may be carried out before or after or even during the reaction with the cyclic dicarbonyl compound.

To accelerate the reaction, bases, preferably organic bases and, more preferably, tertiary amines may be used in known manner. As mentioned hereinafter, these bases are preferably used in a quantity of from about 50 to 100 mole percent, based on the quantity of cyclic dicarbonyl compounds. This gives blocked polyisocyanates which have the advantage according to the invention of being directly (i.e. without further modification) soluble or dispersible, even in water. The reaction is preferably carried out in an organic solvent, although in principle it may even be carried out in the absence of solvents, for example particularly when low-viscosity polyisocyanates are used. Suitable solvents are, for example, ethylene glycol ethyl ether acetate, propylene glycol methyl ether acetate, butyl acetate, acetone, methyl ethyl ketone, cyclohexanone, N,N-dimethyl formamide and N-methyl pyrrolidone.

It is preferred to use organic solvents which are also soluble in water. This enables the products to be dispersed particularly easily in cases where the blocked polyisocyanates are to be used in the form of aqueous solutions or dispersions. The particularly preferred organic solvent is N-methyl pyrrolidone. The organic solvents are generally used in a quantity of from about 5 to 50%, preferably in a quantity of from about 10 to 30%, based on the mixture as a whole.

As already mentioned, the products obtained by the process according to the invention have the interesting property of being soluble or dispersible in water in the presence of bases. Bases suitable for this purpose are, in particular, tertiary amines, i.e., organic compounds containing at least one tertiary nitrogen atom and having a molecular weight of preferably from about 59 to 300. Monofunctional tertiary amines are preferred. Suitable tertiary amines are, for example, trimethylamine, triethylamine, N,N-dimethyl benzylamine or N,N-dimethyl ethanolamine.

The nature of the interaction between the blocked polyisocyanates according to the invention and the amines is not known in detail. This surprising phenomenon is presumably attributable to the fact that the isocyanate groups blocked in accordance with the invention with cyclic dicarbonyl compounds contain acid hydrogen atoms, i.e. are monobasic acids which are capable of forming ammonium salts with the amines. In general, the products obtained by the process according to the invention are soluble or dispersible when they contain "neutralized" isocyanate groups blocked by cyclic dicarbonyl compounds in a quantity of at least about 80 and preferably from about 110 to 300 milliequivalents per 100 g of solids, including the amines. The particle size of the solids dissolved or dispersed in the aqueous phase depends primarily upon the content of ionic structural units such as these.

As mentioned above, these bases are preferably added during the actual production of the blocked polyisocyanates according to the invention, in which case they also act as catalysts. However, in cases where it is intended to disperse base-free or low-base, blocked polyisocyanates of the type mentioned above in water, it is possible to add the bases immediately before or even during dispersion, for example by adding the bases to the dispersion water. The products according to the invention may be dispersed both by introduction into the aqueous phase and also by stirring the aqueous phase into a solution or melt of the blocked polyisocyanates or even by continuously mixing the two phases in suitable mixing units. If, for reasons of viscosity, organic solvents have to be present during the dissolution or dispersion of the products and if, nevertheless, solvent-free aqueous dispersions or solutions of the blocked polyisocyanates are to be obtained, the solvents used may be - in known manner - solvents having a sufficiently low boiling point, such as acetone for example which may be distilled off after dispersion. In general, water is used in such a quantity for dispersion that the dispersions have as high a solids content as possible. In general, solutions or dispersions having a solids content of from about 30 to 60% may readily be produced.

To produce aqueous solutions or dispersions of the products obtained by the process according to the invention, it is preferred to use products of the type in question which no longer contain any free isocyanate groups, i.e. of which the isocyanate groups are completely blocked by blocking agents essential to the invention and, optionally, by the "conventional" blocking agents mentioned by way of example. However, it would also be possible in principle to prepare aqueous solution or dispersions of process products according to the invention containing free isocyanate groups, although this would of course amount to destroying these free isocyanate groups, optionally with chain extension, to form ureas.

The products of the process according to the invention are particularly suitable for use as reagents for compounds containing isocyanate-reactive hydrogen atoms in the production of high molecular weight isocyanate polyaddition products. In this connection, reactants suitable for use as reactants for the products of the process according to the invention are the compounds known from polyurethane chemistry which contain at least two isocyanate-reactive groups and which have a molecular weight in the range from about 60 to 10,000 and preferably in the range from about 400 to 6000. The compounds in question are, in particular, compounds containing at least two alcoholic hydroxyl groups, carboxyl groups, amino groups and/or thiol groups. The corresponding polyhydroxyl compounds are the preferred reactants for the products of the process according to the invention. Examples of polyhydroxyl compounds such as these are the known polyhydroxy polyesters, polyethers, polythioethers, polyacetals, polycarbonates or polyester amides of the type mentioned by way of example in the literature reference "High Polymers" or "Kunststoff-Handbuch" cited previously. Other suitable reactants are the known polyhydroxy polyacrylates or polyurethanes containing at least two hydroxyl groups and having molecular weights in the above-mentioned range, of the type obtainable by reacting excess quantities of polyhydroxyl compounds with polyisocyanates of the type mentioned by way of example in the foregoing. Epoxy resins of the glycidyl ether type, such as are obtainable, for example, by reacting bisphenol A with excess quantities of epichlorohydrin, are also suitable reactants for the products obtained by the process according to the invention. Particularly preferred reactants for the process products according to the invention are the polyhydroxyl polyesters, polyethers, polyacrylates and oligourethanes mentioned by way of example and also the low molecular weight chain extending agents or crosslinking agents known from polyurethane chemistry containing at least two hydroxyl groups and having a molecular weight in the range from about 62 to 300, such as for example ethylene glycol, tetramethylene glycol, 1,2-butane diol, hexamethylene glycol, glycerol or trimethylol propane. Mixtures of compounds such as these containing isocyanate-reactive groups may of course also be used in the application of the process products according to the invention for the production of isocyanate polyaddition products, particularly polyurethanes.

In this application according to the invention of the products obtained by the process according to the invention, the reactants are mixed with one another in quantities corresponding to an equivalent ratio of blocked isocyanate groups to isocyanate-reactive groups of from about 0.1:1 to 1:1.2 and preferably from about 0.3:1 to 1:1 and at an equivalent ratio of free and blocked isocyanate groups to isocyanate-reactive groups of from about 0.8:1 to 1:1.2 and preferably about 1:1. The free isocyanate groups present, if any, react spontaneously with some of the isocyanate-reactive groups to form oligomeric plastics precursors; whereas, the reaction between the blocked isocyanate groups and the isocyanate-reactive groups only takes place after the application of heat, for example at temperatures in the range from about 80° to 250° C., preferably from about 100° to 180° C. The reactants may be mixed in the presence of organic solvents of the type already mentioned by way of example in the foregoing. Solutions such as these may be used, for example, as heat-crosslinkable clear lacquers or for the production of pigmented lacquers.

Another potential application for the products obtained by the process according to the invention is in the production of aqueous stoving lacquers, in which case aqueous solutions or dispersions of compounds containing isocyanate-reactive groups are combined with water-soluble or water-dispersible process products according to the invention of the type mentioned above. For this application, too, it is preferred, in accordance with the foregoing observations, to use those process products according to the invention which contain only blocked isocyanate groups, the equivalent ratio of blocked isocyanate groups to isocyanate-reactive groups preferably amounting in this case to between about 0.1:1 and 1:1.2 and, more preferably, to between about 0.8:1 and 1:1.1. Aqueous solutions or dispersions such as these may readily be produced by mixing the water-soluble or water-dispersible process products according to the invention with aqueous solutions or dispersions of the compounds containing active hydrogen prepared beforehand. It is also possible, as described above, initially to prepare an aqueous solution or dispersion of the process products according to the invention and then to mix the aqueous solution or dispersion thus prepared with separately prepared aqueous solutions or dispersions of the compounds containing isocyanate-reactive groups. In both cases, it is of course necessary for the compounds containing isocyanate-reactive groups, where they are not soluble or dispersible in water, to be modified, for example, with external emulsifiers or preferably by the incorporation of hydrophilic groups such as carboxylate or sulfonate groups in such a way that the compounds are soluble or dispersible in water. Particularly suitable compounds of this type are carboxyl-group- and hydroxyl-group-containing polyacrylates or oligourethanes having molecular weights in the above-mentioned range, of which the carboxyl groups may be converted into hydrophilic carboxylate groups, for example with tertiary amines of the type mentioned by way of example in the foregoing.

In principle, it is also possible to mix the unneutralized process products according to the invention with aqueous solutions of organic polyamines, particularly diamines containing primary or secondary amino groups, such as for example ethylene diamine, diethylene triamine, hexamethylene diamine or isophorone diamine, the primary or secondary amino groups performing the dual function of a neutralizing agent for the isocyanate groups blocked in accordance with the invention to guarantee their solubility or dispersibility in water and of a reactant for the blocked and free isocyanate groups of the process products according to the invention, so that aqueous solutions or dispersions of heat-crosslinkable systems are also formed. However, this application of the process products according to the invention, although possible in principle, is less preferred.

The combinations of process products according to the invention and compounds containing isocyanate-reactive groups, both in the form of organic solutions and also in the form of aqueous dispersions or solutions, are stable against gelation, coagulation or sedimentation at room temperature, even in the event of prolonged storage. They are eminently suitable for the production of plastics, particularly coatings and sealing compounds on a plurality of substrates, such as textiles, leather, glass fibers, plastics, ceramic materials, glass and wood. However, the combinations are particularly suitable for use as stoving lacquers for heat-resistant substrates, particularly metals.

For producing the coatings, the substrates are coated with the combinations according to the invention (which may optionally be mixed with standard lacquer auxiliaries such as pigments, fillers or levelling agents) by the usual methods, for example by spray coating, spread-coating or dip-coating. Thermal hardening is generally carried out at temperatures in the range from about 80° to 250° C. and preferably at temperatures in the range from about 100° to 180° C., the removal of any solvents or of the water by volatilization or evaporation being carried out before or during this heat treatment.

The invention is illustrated by the following examples, in which all the percentages quoted represent percentages by weight, unless otherwise indicated.

EXAMPLES

EXAMPLE 1

208 g of triethylamine was added dropwise with stirring to a mixture of 400 g of an isocyanurate polyisocyanate (NCO-content 21%) obtained by the trimerization of hexamethylene diisocyanate, 300 g of isopropylidene malonate (Meldrum's acid) and 300 g of N-methyl pyrrolidone. The mixture was then stirred for 8 hours at 50° C. until no more NCO-groups could be detected by IR-spectroscopy. The product had a viscosity of 20,000 mPas (23° C.), contained 7.0% of blocked NCO-groups and 229 milliequivalents of neutralized blocked isocyanate groups per 100 g of solids and showed high solubility in water.

EXAMPLE 2

A clear lacquer was prepared from 60 g of the blocked polyisocyanate according to Example 1 and 50 g of a 75% solution of an OH-functional lacquer polyester in ethyl glycol acetate ("polyester resin A" prepared from 29.6% of isophthalic acid; 10.1% of adipic acid; 5.9% of o-phthalic acid; 42.4% of 1,6-hexane diol; 12.0% of trimethylol propane; OH-number 150). The equivalent ratio of blocked isocyanate groups to hydroxyl groups was 1:1.

The lacquer was applied to a glass plate (wet film thickness: 120 m) and stoved for 30 minutes at 140° C. An elastic lacquer film with a dry surface and high resistance to solvents was obtained (cf. Table 1).

EXAMPLE 3

60 g of the blocked polyisocyanate according to Example 1 were added with thorough stirring to 263 g of a 30% aqueous dispersion of an OH-functional polyurethane resin. The dispersion of this resin ("polyurethane resin B") was prepared from the following starting materials: 15.0% of a polyester diol of neopentyl glycol and hexahydrophthalic acid. OH-number 192; 3.2% of a polyester diol of 1,6-hexane diol and adipic acid, OH-number 133; 0.77% of trimethylol propane; 2.56% of dimethylol propionic acid; 8.47% of isophorone diisocyanate; 2.6% of dimethyl benzylamine; 0.4% of triethylamine; 67.0 of water. The OH-number of the OH-functional polyurethane resin, based on solids without amines, amounted to 71.2. The equivalent ratio of blocked isocyanate groups to hydroxyl groups of the resin amounted to 1:1.

The blocked isocyanate dissolved smoothly and completely. A finely divided, storable aqueous stoving lacquer dispersion was formed. It was applied to glass plates (wet film thickness: 120 μm) and stoved for 30 minutes at 140° C. and 160° C. Elastic films having a dry surface and high solvent resistance (cf. Table 1) were obtained.

TABLE 1

| | Lacquer film properties | | | | |
|---|---|---|---|---|---|
| | Example 2 | Polyester resin A | Example 3 | | Polyester Resin B |
| Stoving temperature | 140° C. | 140° C. | 140° C. | 160° C. | 160° C. |
| Surface[1] | 0 | 5 | 0 | 0 | 0 |
| Elasticity (span)[2] | 2 | 0 | 2–3 | 2–3 | 5 |
| Solvent resistance[3] (cottonwool pad, 1 minute/5 minutes) | | | | | |
| Toluene | 1/4 | 5 | 0/1 | 0/0 | 3/5 |
| Ethyl glycol acetate | 1/4 | 5 | 0/1 | 0/0 | 5 |
| Acetone | 4 | 5 | 4 | 4 | 5 |

Explanations
[1] 0 = dry, 5 = tacky
[2] 0 = very soft, 2 = elastic, 5 = very brittle
[3] 0 = lacquer unchanged, 3 = swollen, 5 = dissolved
Solvent resistance was tested by applying a cottonwool pad impregnated with the solvent. Where only one figure is quoted, the cottonwool pad was applied for 1 minute. Where 2 figures are quoted, the first figure refers to a contact time of the cottonwool pad of 1 minute and the second figure to a contact time of 5 minutes.

EXAMPLE 4

2.5 g of sodium phenolate were added to a mixture of 400 g of an isocyanurate polyisocyanate (NCO-content: 21%) obtained by the trimerization of hexamethylene diisocyanate, 128 g of malonic acid diethyl ester and 300 g of N-methyl pyrrolidone. The mixture was stirred at 60° C. until the calculated content of free NCO-groups was just below 6%. After cooling to 30° C., 173 g of isopropylidine malonate were introduced, followed by the dropwise addition of 121 g of triethylamine. After the exothermic reaction had abated, the mixture was stirred for 8 hours at 50° C. until no more NCO-groups could be detected by IR-spectroscopy. The product has a viscosity of 11,000 mPas (23° C.), contained 7.5% of blocked NCO-groups and 146 milliequivalents of neutralized, isopropylidene-malonate-blocked isocyanate groups per 100 g of solids and showed high solubility in water.

EXAMPLE 5

A clear lacquer was prepared from 56 g of the blocked polyisocyanate according to Example 4 and 50 g of a 75% ethyl glycol acetate solution of the polyester resin A described in Example 2. The clear lacquer thus prepared was applied to a glass plate (wet film thickness: 120 μm) and stoved for 30 minutes at 140° C. The equivalent ratio of blocked isocyanate groups to hydroxyl groups was 1:1. An elastic film having a dry surface and high resistance to solvents (cf. Table 2) was obtained.

EXAMPLE 6

56 g of the blocked polyisocyanate according to Example 4 were added with thorough stirring to 263 g of a 30% aqueous dispersion of the polyurethane resin B described in Example 3. The blocked polyisocyanate dissolved smoothly and completely. The equivalent ratio of blocked isocyanate groups to hydroxyl groups amounted to 1:1. A finely divided, storable, aqueous stoving lacquer dispersion was formed and applied to glass plates (wet film thickness: 120 μm) and stoved for 30 minutes at 140° C. and 160° C. Elastic lacquer films having a dry surface and high resistance to solvents were obtained (cf. Table 2).

TABLE 2

| | Lacquer film properties | | | | |
|---|---|---|---|---|---|
| | Example 5 | Polyester resin A | Example 6 | | Polyester resin B |
| Stoving temperature | 140° C. | 140° C. | 140° C. | 160° C. | 160° C. |
| Surface[1] | 0 | 5 | 0 | 0 | 0 |
| Elasticity (span)[2] | 2 | 0 | 2-3 | 2-3 | 5 |
| Solvent resistance[3] (cottonwool pad, 1 minute/5 minutes) | | | | | |
| Toluene | 1 | 5 | 0/4 | 0/2 | 3/5 |
| Ethyl glycol acetate | 0/2 | 5 | 2/4 | 0/4 | 5 |
| Acetone | 3 | 5 | 4 | 4 | 5 |

For explanations, see Table 1.

EXAMPLE 7

70 g of butanone oxime were added dropwise to a mixture of 372 g of a biuret-group-containing polyisocyanate based on hexamethylene diisocyanate (NCO-content: 22.6%) and 300 g of N-methyl pyrrolidone. After stirring for 3 hours at 50° C., the mixture was cooled to 30° C. and 173 g of isopropylidine malonate were added. 121 g of triethylamine were then added dropwise. After the exothermic reaction had abated, the reaction mixture was stirred for 8 hours at 50° C. until no more NCO-groups could be detected by IR-spectroscopy. The product obtained had a viscosity of 6000 mPas (23° C.), contained 8.1% of blocked NCO-groups and 163 milliequivalents isopropylidene-malonate-blocked isocyanate groups per 100 g of solids neutralized and was soluble in water.

After stoving (for 30 minutes at 140° C.), a lacquer (blocked NCO-OH=1) produced in accordance with Example 2 from this blocked polyisocyanate and polyester resin A was dry and elastic and showed high water and solvent resistance.

EXAMPLE 8

A mixture of 400 g of an isocyanurate polyisocyanate (NCO-content 21%) obtained by the trimerization of hexamethylene diisocyanate, 300 g of N-methyl pyrrolidone and 90.4 g of ξ-caprolactam was stirred at 60° C. until the NCO-content was just below the calculated value of 6.4%. 173 g of isopropylidene malonate were added to this solution, followed by the dropwise addition of 121 g of triethylamine. After the exothermic reaction had abated, the reaction mixture was stirred for 8 hours at 50° C. until no more NCO-groups could be detected by IR-spectroscopy. The product had a viscosity of 8500 mPas (23° C.), contained 7.7% of blocked NCO-groups and 153 milliequivalents of neutralized, isopropylidene-malonate-blocked isocyanate groups per 100 g of solids and showed high solubility in water.

After stoving (for 30 minutes at 160° C.), a lacquer (blocked NCO:OH=1) produced in accordance with Example 2 from this blocked polyisocyanate and the polyester resin A was dry and elastic and showed high water and solvent resistance.

EXAMPLE 9

50 g of triethylamine were added dropwise to a mixture of 100 g of an isocyanurate polyisocyanate (NCO-content: 21%) obtained by the trimerization of hexamethylene diisocyanate, 92 g of cyclohexylidene malonate and 75 g of N-methyl pyrrolidone. The mixture was then stirred for 8 hours at 50° C. until no more NCO-groups could be detected by IR-spectroscopy. The product had a viscosity of 150,000 mPas (23° C.), contained 6.6% of blocked NCO-groups and 208 milliequivalents of neutralized cyclohexylidene-malonate-blocked isocyanate groups per 100 g of solids and was soluble in water. After stoving (for 30 minutes at 140° C.), a lacquer (blocked NCO:OH)=1) produced as in Example 2 from this blocked polyisocyanate and polyester resin A was elastic, tack-free and resistant to water and solvents.

EXAMPLE 10

A blocked polyisocyanate was prepared in the same way as in Example 9, except that 85 g of cyclopentylidene malonate were used instead of the cyclohexylidene malonate. The product obtained had a viscoisty of 135,000 mPas (23° C.), contained 6.8% of NCO-groups and was soluble in water. A lacquer produced in accordance with Example 9 showed comparable properties.

EXAMPLE 11

A solution of 134 g of trimethylol propane in 437 g of N-methyl pyrrolidone was added dropwise with cooling to 522 g of diisocyanatotoluene (80:20 mixture of 2,4 and 2,6-isomers). After the exothermic reaction had abated, the mixture was stirred at 60° C. until the NCO-content had fallen just below the calculated value of 11.5%.

40 g of N-methyl pyrrolidone and 116 g of isopropylidene malonate were added to 300 g of this adduct at room temperature. 81 g of triethylamine were slowly added to the resulting mixture which was then stirred for 4 hours at 50° C. until no more NCO-groups could be detected by IR-spectroscopy. 500 g of water were then added. A clear, yellowish solution was formed, to which 135 g of 6N HCl were added dropwise, as a result of which the base-free blocked isocyanate precipitates in the form of a light deposit. It was filtered off, washed with water and dried in vacuo.

Yield: 284 g (96% of the theoretical). Pale yellow powder, melting point: 92°-95° C.

EXAMPLE 12

37 g of the solid blocked polyisocyanate according to Example 11 were introduced with stirring into a mixture of 76 g of water and 10.1 g of triethylamine. A finely divided, storable, aqueous dispersion free from organic cosolvents was formed. The dispersed solid contained 212 milliequivalents of neutralized, isopropylidene-malonate-blocked isocyanate groups per 100 g of solids. By mixing with 263 g of a 30% aqueous dispersion of the polyurethane resin B described in Example 3, an aqueous stoving lacquer was obtained, from which is was possible to produce lacquer films which were dry and solvent-resistant after stoving for 30 minutes at 140° C.

EXAMPLE 13

20.2 g of triethylamine were added to a solution of 57.6 g of isopropylidene malonate, 50 g of 4,4'-diisocyanatodiphenyl methane and 200 g of N-methyl pyrrolidone. The mixture was stirred at 40° C. for 35 hours, after which no more NCO-groups could be detected by IR-spectroscopy. 150 g of water were added and 35 g of 6N HCl stirred in while cooling. The deposit formed was filtered off, washed with cold water and dried in vacuo.

Yield: 82 g of solid, blocked diisocyanate (78% of the theoretical).

Content of blocked NCO-groups: 15.5%.

Although the invention has been described in detail in the forgoing for the purpose of illustration, it is to be understood that such detail is solely for that purpose and that variations can be made therein by those skilled in the art without departing from the spirit and scope of the invntion except as it may be limited by the claims.

What is claimed is:

1. A process for the production of an organic polyisocyanate containing at least partly blocked isocyanate groups which comprises at least partly blocking the isocyanate groups of an organic polyisocyanate reactant with a blocking agent for isocyanate groups comprising
   (a) a cyclic dicarbonyl compound containing the following characteristic structural unit

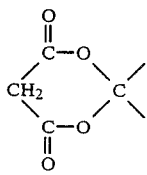

and, optionally,
   (b) a blocking agent for isocyanate groups other than (a), the blocking agent (a) being used in quantities corresponding to a molar ratio of blocking agent (a) to isocyanate groups in the organic polyisocyanate reactant of at least about 0.1:1 and, when used, optional blocking agent (b) being reacted with said organic polyisocyanate before, during or after the reaction of said organic polyisocyanate reactant with the blocking agent (a).

2. The process of claim 1 wherein blocking agent (a) is a compound corresponding to the following formula

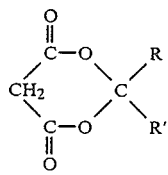

in which R and R' may be the same or different and represent alkyl or aryl groups optionally containing inert substituents or, together with the carbon atom attached to the two oxygen atoms, form a cycloalkyl ring optionally containing inert substituents.

3. The process of claim 2, wherein R and R' each represent methyl radicals or, together with the carbon atom attached to the two oxygen atoms, form a cyclohexane or cyclopentane ring.

4. The process of claim 2 wherein blocking agent (b) comprises a member selected from the group consisting of malonic acid dialkyl esters, acetoacetic acid alkyl esters, ketoximes, aldoximes, lactams, phenols, alkyl-substituted phenols and mixtures thereof, the blocking agent (b) being used in quantities corresponding to a molar ratio of blocking agents to isocyanate groups in the organic polyisocyanate reactant of up to about 0.9:1.

5. The process of claim 3 wherein blocking agent (b) comprises a member selected from the group consisting of malonic acid dialkyl esters, acetoacetic acid alkyl esters, ketoximes, aldoximes, lactams, phenols, alkyl-substituted phenols and mixtures thereof, the blocking agent (b) being used in quantities corresponding to a molar ratio of blocking agents to isocyanate groups in the organic polyisocyanate reactant of up to about 0.9:1.

6. The process of claim 2 wherein blocking agent (a) is used as the sole blocking agent in quantities corresponding to a molar ratio of blocking agent to isocyanate groups in the organic polyisocyanate reactant of from about 0.3:1 to 1:1.

7. The process of claim 3 wherein blocking agent (a) is used as the sole blocking agent in quantities corresponding to a molar ratio of blocking agent to isocyanate groups in the organic polyisocyanate reactant of from about 0.3:1 to 1:1.

8. The process of claim 2 which additionally comprises mixing said organic polyisocyanate containing at least partly blocked isocyanate groups with water in the presence of a base in a quantity sufficient to guarantee solubility or dispersibility of said organic polyisocyanate in water.

9. The process of claim 3 which additionally comprises mixing said organic polyisocyanate containing at least partly blocked isocyanate groups with water in the presence of a base in a quantity sufficient to guarantee solubility or dispersibility of said organic polyisocyanate in water.

10. An organic polyisocyanate containing at least partly blocked isocyanate groups obtainable in accordance with claim 2.

11. An organic polyisocyanate containing at least partly blocked isocyanate groups obtainable in accordance with claim 3.

12. An organic polyisocyanate containing at least partly blocked isocyanate groups obtainable in accordance with claim 7.

13. An organic polyisocyanate containing at least partly blocked isocyanate groups obtainable in accordance with claim 9.

14. A process for the production of heat-curable compositions which comprises
   (a) preparing an organic polyisocyanate containing at least partly blocked isocyanate groups in accordance with claim 2 and
   (b) forming an admixture of said organic polyisocyanate of step (a) and a compound having a molecular weight of about 60 to 10,000 and containing at least two isocyanate-reactive groups.

15. The process of claim 14 wherein
   (1) said heat-curable composition is an aqueous, heat-curable composition,
   (2) said compound is dispersible or soluble in water and
   (3) said organic polyisocyanate of step (a) is mixed with water in the presence of a base in a quantity sufficient to guarantee the solubility or dispersibility of said organic polyisocyanates either before, during or after forming an admixture in accordance with step (b).

* * * * *